United States Patent [19]

Hilsheimer

[11] 4,006,883
[45] Feb. 8, 1977

[54] ADJUSTABLE SEAT FOR BUTTERFLY VALVES

[76] Inventor: George W. Hilsheimer, P.O. Box 1647, Tulsa, Okla. 74101

[22] Filed: Jan. 8, 1973

[21] Appl. No.: 321,994

[52] U.S. Cl. .............................. 251/307; 251/314; 251/188; 251/363

[51] Int. Cl.² ........................................ F16K 1/22

[58] Field of Search .......... 251/307, 314, 315, 162, 251/163, 171, 187, 188, 192, 200, 203, 204, 361, 362, 363

[56] References Cited

UNITED STATES PATENTS

| 3,144,040 | 8/1964 | White .......................... 251/307 X |
| 3,197,174 | 7/1965 | Killian ............................ 251/307 |
| 3,260,496 | 7/1966 | Borcherdt .................... 251/307 X |
| 3,393,697 | 7/1968 | Fawkes ......................... 251/307 X |
| 3,650,508 | 3/1972 | Kosmala et al. .............. 251/307 X |

Primary Examiner—C. J. Husar
Assistant Examiner—Ira S. Lazarus
Attorney, Agent, or Firm—William S. Dorman

[57] ABSTRACT

An adjustable seat for butterfly valves wherein an annular groove is provided in the valve body for receiving an annular sealing member against one sidewall thereof for sealingly engaging the valve closure member in the closed position of the valve. A plurality of circumferentially spaced inwardly directed lugs are provided on the valve body conterminous with the groove and spaced from the sidewall thereof. A plurality of arcuate seal retainer members are disposed in the groove and interposed between the lugs and the sealing member for retaining the sealing member in a sealing position within the groove. Adjustment members are provided on each lug for selective adjustment of the pressure of the arcuate segments against the sealing member for adjusting the sealing pressure of the sealing member.

6 Claims, 3 Drawing Figures

4,006,883

ADJUSTABLE SEAT FOR BUTTERFLY VALVES

BACKGROUND OF THE INVENTION

1. Field of the Invention

This invention relates to improvements in butterfly valves and more particularly, but not by way of limitation, to an improved adjustable seat for butterfly valves.

2. Description of the Prior Art

The usual butterfly valve comprises a valve body having a circular bore with a substantially disc-shaped closure member rotatably disposed therein. A pair of oppositely disposed shafts are normally provided on the closure disc and extend radially outwardly therefrom through suitable bosses, or the like, whereby the closure disc may be rotated about the axes of the shafts. Suitable valve sealing means and valves seating means is usually provided in the valve for precluding leakage of the fluid through the valve in the closed position of the disc. The sealing of the valves is extremely important, of course, and the sealing of the closure member in extremely large butterfly valves is frequently difficult. In order to improve the sealing of this type valves, adjustable seat members have been developed whereby sealing of selected portions of the outer periphery of the closure member may be provided to improve the overall sealing of the valve. Adjustable seat members of this type are shown in the I. M. White U.S. Pat. No. 3,144,040, issued Aug. 11, 1964, and entitled "Butterfly Valve", and the D. G. Fawkes U.S. Pat. No. 3,393,697, issued July 23, 1968, and entitled "Valve Seat". However, there is always a need for an improved manner of effecting an efficient seat and sealing for the butterfly valve disc.

SUMMARY OF THE INVENTION

The present invention contemplates a novel improved adjustable seat for butterfly valves whereby the sealing of the outer periphery of the closure disc may be selectively adjusted. The novel valve seat comprises an annular groove provided in the valve body for receiving a valve sealing member against one sidewall thereof. A plurality of circumferentially spaced inwardly directed lugs are provided on the valve body conterminous with the groove and spaced from the said sidewall thereof. A plurality of arcuate retaining segments are disposed in the annular groove and interposed between the sealing member and the spaced lugs for bearing against the sealing member to provide sealing pressure therefor. Adjusting means is provided in the spaced lugs for engagement with the arcuate retaining segments for selectively adjusting the pressure of the retaining segments against the sealing member. Thus, the sealing pressure of the sealing ring against the said sidewall, and the radially inward expansion of the sealing ring against the outer periphery of the closure member may be selectively adjusted for assuring an efficient sealing around the closure member.

DESCRIPTION OF THE PREFERRED EMBODIMENT

Figure 1:
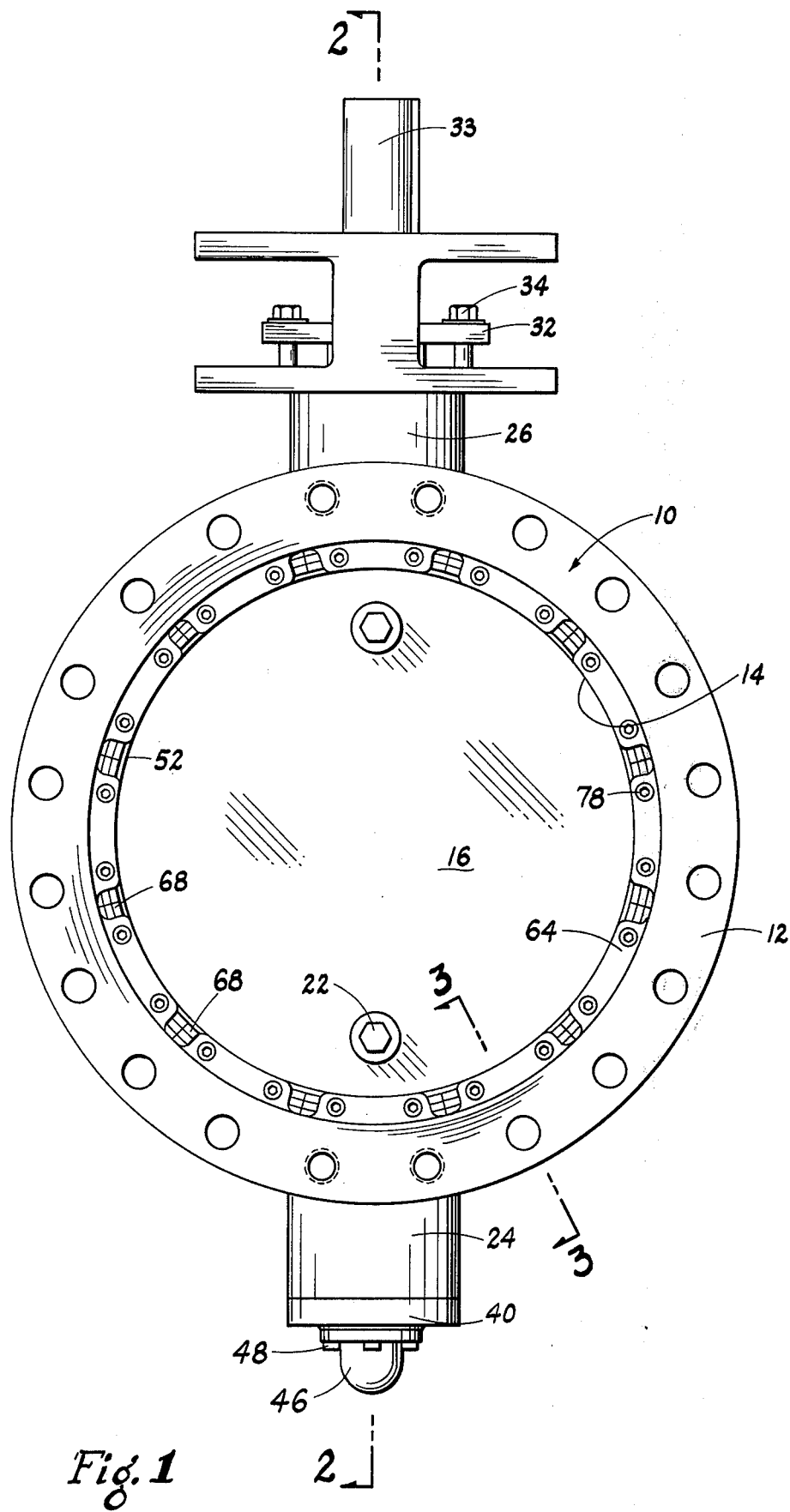
FIG. 1 is a front elevational view of a butterfly valve embodying the invention.
Figure 3:
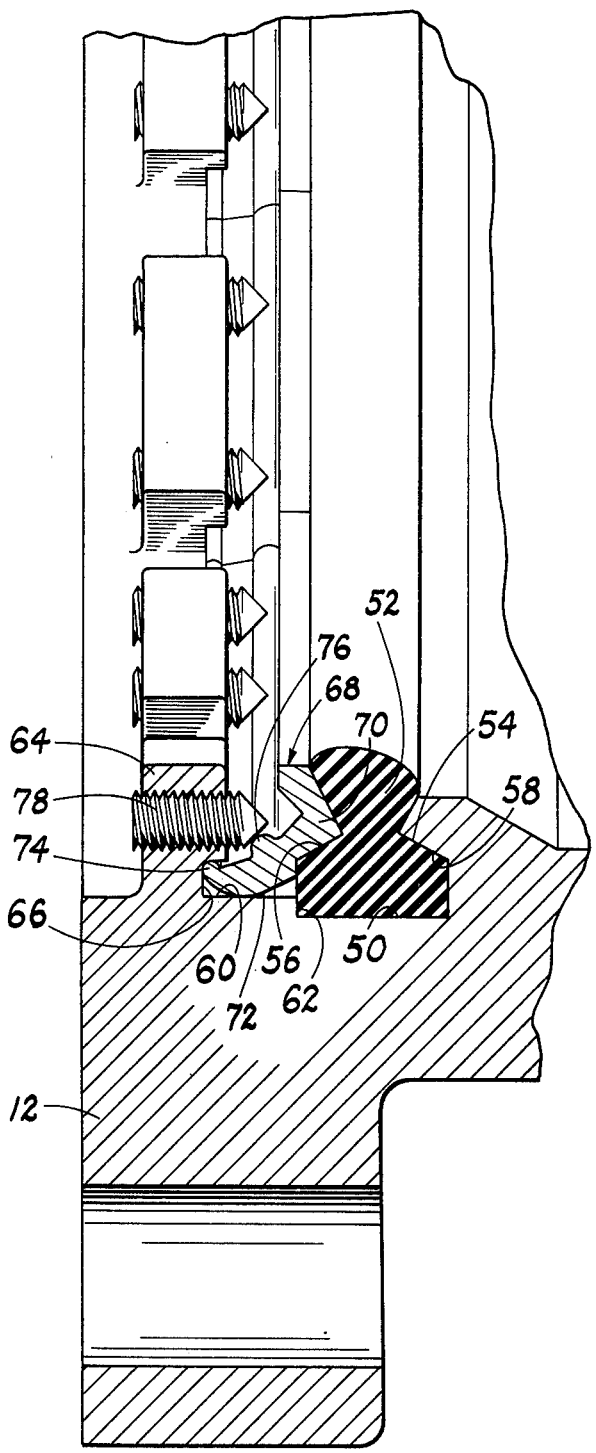
FIG. 3 is an enlarged sectional view taken on line 3—3 of FIG. 1.
Figure 2:
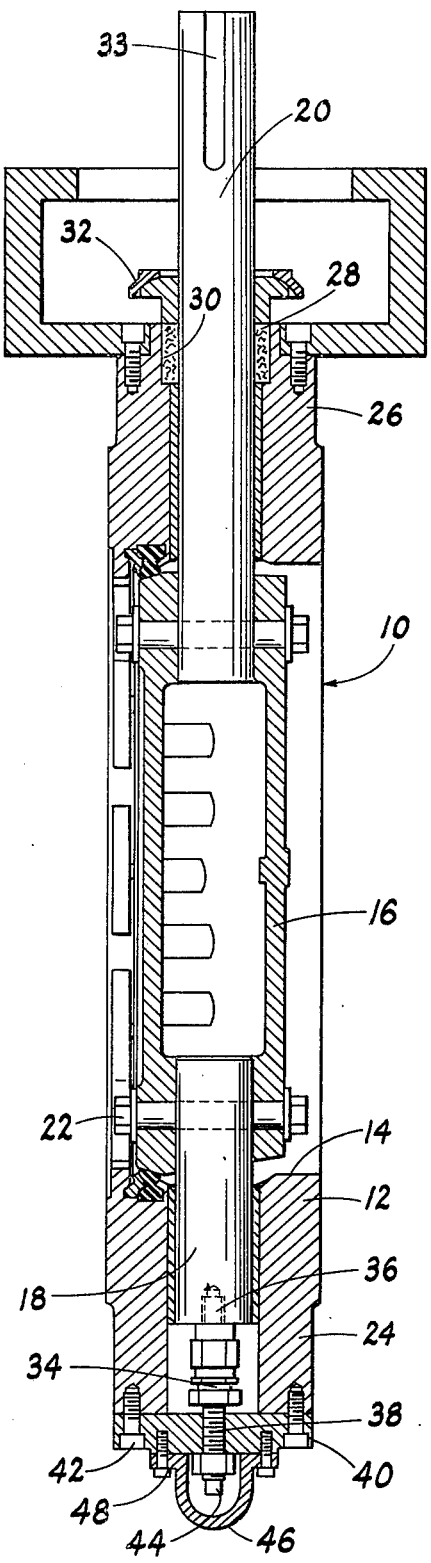
FIG. 2 is a sectional view taken on line 2—2 of FIG. 1.

Referring to the drawings in detail, reference character 10 generally indicates a butterfly valve comprising a body 12 having a bore 14 extending therethrough to provide a fluid passageway through the valve 10 in the open position thereof. A substantially disc-shaped closure member 16 is rotatably disposed within the bore 14 to provide alternate open and closed positions for the valve 10, as is well known. Whereas the closure member 16 may be rotatably secured within the bore 14 in any suitable manner, as shown herein the closure member 16 is secured to a pair of oppositely disposed substantially aligned pivot shafts 18 and 20 by a plurality of bolts 22. The shafts 18 and 20 are suitably journalled in oppositely disposed apertured bosses 24 and 26 provided on the body 12 and extending radially outwardly therefrom. Suitable annular packing rings 28 may be disposed around the shaft 20 and within a recess 30 provided on the boss 26 for precluding leakage of fluid around the shaft 20. A follower member 32 may be disposed around the shaft 20 and adjustably secured to the boss 26 by means of bolts 34 for adjusting the sealing pressure of the packing rings 30, as is well known. Of course, the outer end 33 of the shaft 20 may be provided with a suitable handle (not shown), or the like, for facilitating rotation of the shafts 20 and 18 for rotating the disc 16 within the bore 14 to alternate open and closed positions, as is well known.

The shaft 18 may be journalled in the boss 24 in any suitable manner, and is preferably adjustably secured therein whereby the concentric position of the disc 16 within the bore 14 may be adjusted, as is well known. As shown therein, a fitting member 34 is threadedly secured at 36 to one end of the shaft 18, and is threadedly secured at 38 to a plate member 40 which is removably secured to the boss 24 by a plurality of bolts or screws 42. The outer end 44 projects from the outer surface of the plate 40 whereby the fitting 34 may be rotated manually for adjusting the position of the shaft 18 within the boss 24 in order to adjust the position of the disc 16. Of course, a suitable cover member 46 may be removably secured to the plate 40 by screws, or the like, for protecting the exposed end 44 of the fitting member 34.

An annular groove 50 is provided in the body 12 in open communication with the bore 14 for receiving an annular sealing ring 52 therein. The packing ring or sealing ring 52 is constructed from a suitable resilient material, such as rubber, neoprene, or the like, and the inner periphery thereof is in sealing engagement with the outer periphery of the disc 16 in the closed position thereof. The opposed sidewalls of the ring 52 are undercut or recessed as shown at 54 and 56. One sidewall 58 of the groove 50 is undercut complementary with the recess 54 of the ring 52 and cooperates therewith for facilitating retaining of the ring 52 in the groove 50.

A second annular groove 60 is provided in the body 12 conterminous with the groove 50 and having one side thereof open to the groove 50 thus providing a relatively short annular shoulder 62 spaced from the sidewall 58 a distance substantially equal to the width of the ring 52 for cooperating with the wall 58 for receiving the ring 52 therebetween. A plurality of inwardly directed arcuate lugs or flanges 64 are provided on the body 12 which form the outer wall for the groove 60. As shown herein the lugs 64 are integral with the body 12. However, it will be apparent that the lugs 64 may be independent from the body 12, and secured thereto in any suitable manner, such as by bolts, or the like. The inwardly directed edge or surface of each lug 64 is provided with an undercut groove or recess 66 extending throughout the length thereof. A plurality of arcuate retainer elements or segments 68 are loosely disposed in the groove 60 in end to end relation with one side edge thereof being disposed in the recess or undercut 66 of the lugs 64, and the opposite side edge thereof disposed adjacent the wall 56 of the ring 52.

The segments 68 are of a substantially identical configuration and it is preferable to provide a segment 68 for each lug 64, with the segments 68 being disposed within the groove 60 in substantial alignment with the respective lug 64. The segments 68 are in an end to end relation within the groove 60, as hereinbefore set forth, thus providing a substantially annular retainer ring against the sidewall 56 of the ring 52. One side portion of each segment 68 is provided with an outwardly projecting ridge 70 extending along the length thereof, and of a configuration complementary to or corresponding with the undercut 56 of the ring 52. It will be apparent that the ridge 70 and sidewall 58 cooperate for retaining the ring 52 in position in the groove 50, and for adjusting the sealing pressure of the ring 52 against the outer periphery of the disc 16, as will be hereinafter set forth. Each segment 68 is also provided with an arcuate lower surface 72 conterminous with the ridge 70 and in engagement with the groove 60 in such a manner that the segment 68 may be selectively pivoted or rocked in directions toward and away from the ring 52. The arcuate surface 72 terminates in a rounded edge portion 74 which extends along the length of each segment 68 and is disposed within the undercut 66 of the lugs 64. The upper surface of each segment 68 is provided with a projection 76 which extends along the length thereof. Each lug 64 is provided with a plurality of spaced adjusting screws 78 which selectively engage the projection member 76 of the respective retaining segment 68 for a purpose as will be hereinafter set forth.

When the valve 10 is assembled as shown herein, it may be found that portions of the outer periphery of the disc 16 are not efficiently sealed against leakage, particularly in the construction of relatively large butterfly valves of this type. When this occurs, the packing ring 52 may be selectively adjusted at the particular perpherial locations wherein leakage occurs. In order to selectively adjust the sealing pressure of the ring 52, the adjusting screws 78 of the lugs 64 disposed in the proximity of the leakage may be moved in a direction toward the ring 52. As the screws 78 move inwardly toward the ring 52, the inner ends of the screws 78 engage the projection member 76 of the respective segment 68. The lip or edge 74 of the segment is retained in the undercut 66, and the arcuate surface 72 is thus rocked in the groove 60 whereby the ridge 70 of the segment 68 moves into a tighter engagement with the ring 52 thus squeezing the ring 52 more tightly between the wall 58 and the ridge 70. Since the ring 52 is contained within the groove 50 this added squeezing pressure causes the resilient material of the ring 52 to expand radially. The radial outward expansion provides a tighter seal between the ring 52 and the groove 50 for increasing the sealing efficiency therebetween, and the radial inward expansion provides an increased sealing pressure of the ring 52 against the outer periphery of the ring 16 for increasing the sealing efficiency therebetween. Any or all of the segments 68 may be similarly adjusted against the portion of the ring 52 in the proximity thereof for assuring an efficient sealing around the entire outer periphery of the disc 16.

Of course, it will be apparent that whereas the spaced lugs 64 as shown herein are preferable, a continuous annular shoulder may be provided in lieu of the lugs 64, with a plurality of adjusting screws being spaced along the shoulder for engagement with the retaining segments 68 in the manner as hereinbefore set forth.

From the foregoing it will be apparent that the present invention provides a novel adjustable seat for butterfly valves wherein the sealing engagement around the outer periphery of the valve disc may be selectively adjusted for assuring an efficient sealing of the valve in the closed position thereof. The novel adjustable seat and seal member comprises a plurality of arcuate retaining elements loosely disposed in an annular groove provided in the valve body, and in engagement with an annular sealing ring which, in turn, is in sealing engagement with the outer periphery of the valve disc in the closed position thereof. A plurality of inwardly directed lug members are provided in the valve body having undercut recess means for receiving one side edge of the arcuate segments therein, and having adjusting members extending therethrough for engagement with the arcuate segments. The arcuate retaining segments are pivotal or rockable by the adjusting members for selectively engaging the resilient sealing ring in order to adjust the sealing pressure thereof against the valve body and valve disc for assuring an efficient sealing around the entire outer periphery of the valve disc during the closed positions of the valve. The novel adjustable valve seating means is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A valve seat for a butterfly valve having a valve body and a valve disc rotatable to alternate open and closed positions, comprising a first annular groove provided in the valve body in substantial alignment with the closed position of the valve disc, a resilient valve seat disposed within said annular groove and having the outer periphery thereof in sealing engagement with the groove and the inner periphery thereof in sealing engagement with the outer periphery of the valve disc in the closed position thereof, said valve seat being provided with oppositely disposed annular recesses, one sidewall of said annular groove being provided with recess means complementary to the recess means of the valve seat disposed adjacent thereto, a second annular groove provided in the valve body and in open communication with the first annular groove, inwardly directed flange means provided on the body conterminous with the second annular groove and spaced from the first annular groove, a plurality of arcuate retaining segments disposed in end to end relation within said second annular groove between the flange means and valve seat means, said arcuate retaining segments being provided with longitudinally extending ridge means along one side thereof of a configuration complementary to the recess of the valve seat disposed thereagainst, a longitudinally extending curved sidewall provided on each retaining segment conterminous with the ridge and engagable with the second annular groove whereby said retaining segments are pivotally disposed therein, projection means provided on each retaining segment oppositely disposed with respect to the curved sidewall, and adjusting means provided on said lug means and engagable with the projection means for selectively rocking the retaining segments in a direction toward the valve seat, said ridge of each retaining segment cooperating with the recess of the sidewall of the first annular groove for selectively adjusting the sealing pressure of the valve seat against the outer periphery of the valve disc upon rocking of the segments by said adjusting means.

2. A valve seat as set forth in claim 1 wherein the inwardly directed flange means comprises a plurality of circumferentially spaced lug members, at least one of said lug members being provided for each retaining segment.

3. A valve seat as set forth in claim 2 wherein each lug member is provided with a longitudinally extending recess for receiving one side edge of the respective retaining segment therein for facilitating the rocking of the segment during adjustment thereof against the valve seat member.

4. A valve seat for a butterfly valve having a valve body and a valve disc rotatable to alternate open and closed positions, comprising a first annular groove provided in the valve body, a resilient annular valve seat disposed within said first groove and having the inner periphery thereof in engagement with the outer periphery of the valve disc in the closed position thereof, a second annular groove provided in the valve body conterminous with the first groove and in open communication therewith, radially inwardly directed flange means provided on the body conterminous with the second groove and spaced from the first groove, a plurality of arcuate retaining segments loosely disposed in the second groove between the valve seat and the flange means, said retaining segments being rockable in said second groove in directions away from and toward the valve seat for selective pressure engagement from the valve seat, and adjustment means carried by the flange means for selectively rocking said segments to provide said pressure engagement with the valve seat, said flange means being provided with recess means conterminous with the second annular groove for receiving a portion of the arcuate segments therein.

5. A valve seat for a butterfly valve having a valve body and a valve disc rotatable to alternate open and closed positions, comprising a first annular groove provided in the valve body, a resilient annular valve seat disposed within said first groove and having the inner periphery thereof in engagement with the outer periphery of the valve disc in the closed position thereof, a second annular groove provided in the valve body conterminous with the first groove and in open communication therewith, radially inwardly directed flange means provided on the body conterminous with the second groove and spaced from the first groove, a plurality of arcuate retaining segments loosely disposed in the second groove between the valve seat and the flange means, said retaining segments being rockable in said second groove in directions away from and toward the valve seat for selective pressure engagement with the valve seat, and adjustment means carried by the flange means for selectively rocking said segments to provide said pressure engagement with the valve seat; each arcuate segment being provided with a longitudinally extending ridge engagable with the valve seat for facilitating retaining of the valve seat in the first annular groove for applying sealing pressure to the valve seat, an arcuate sidewall engagable with the second annular groove for providing said rockable engagement therewith, and projections means oppositely disposed with respect to the arcuate sidewall for engagement by the adjustment means to provide said rocking of said segments.

6. A valve seat for a butterfly valve having a valve body and a valve disc rotatable to alternate open and closed positions, comprising a first annular groove provided in the valve body, a resilient annular valve seat disposed within said first groove and having the inner periphery thereof in engagement with the outer periphery of the valve disc in the closed position thereof, a second annular groove provided in the valve body conterminous with the first groove and in open communication therewith, radially inwardly directed flange means provided on the body conterminous with the second groove and spaced from the first groove, a plurality of arcuate retaining segments loosely disposed in the second groove between the valve seat and the flange means, said retaining segments being rockable in said second groove in directions away from and toward the valve seat for selective pressure engagement with the valve seat, and adjustment means carried by the flange means for selectively rocking said segments to provide said pressure engagement with the valve seat, said flange means being provided with recess means conterminous with the second annular groove, and each arcuate segment being provided with a longitudinally extending rounded edge means engagable with said flange recess means for facilitating the rocking of said segments.

* * * * *